United States Patent [19]
Shaikh

[11] Patent Number: 5,897,912
[45] Date of Patent: Apr. 27, 1999

[54] METHOD OF MAKING CONDUCTIVE ELECTRODES FOR USE IN MULTILAYER CERAMIC CAPACITORS OR INDUCTORS USING ORGANOMETALLIC INK

[75] Inventor: Aziz S. Shaikh, Ventura, Calif.

[73] Assignee: Ferro Corporation, Cleveland, Ohio

[21] Appl. No.: 08/922,705

[22] Filed: Sep. 3, 1997

[51] Int. Cl.$^6$ ........................................ B05D 5/12
[52] U.S. Cl. .................... 427/79; 427/126.3; 427/126.5; 427/372.2; 29/25.41; 29/25.42
[58] Field of Search .................. 427/79, 126.3, 427/126.5, 372.2; 29/25.41, 25.42; 361/320–322

[56] References Cited

U.S. PATENT DOCUMENTS

| | | | |
|---|---|---|---|
| 2,389,420 | 11/1945 | Deyrup | 75/22 |
| 3,810,879 | 5/1974 | Hay et al. | 260/93.5 R |
| 3,902,102 | 8/1975 | Burn | 317/258 |
| 4,192,698 | 3/1980 | Maher et al. | 156/89 |
| 4,510,179 | 4/1985 | Honjo et al. | 427/96 |
| 4,572,843 | 2/1986 | Saito et al. | 427/53.1 |
| 4,633,373 | 12/1986 | Phillips | 361/433 |
| 4,859,641 | 8/1989 | Fujino et al. | 501/136 |
| 4,954,926 | 9/1990 | Pepin | 361/304 |
| 5,165,986 | 11/1992 | Gardner et al. | 428/209 |
| 5,244,742 | 9/1993 | Ogi et al. | 428/469 |
| 5,246,879 | 9/1993 | Hsu et al. | 437/180 |
| 5,254,360 | 10/1993 | Crownover et al. | 427/79 |
| 5,310,709 | 5/1994 | Wada et al. | 501/134 |
| 5,331,504 | 7/1994 | Kamiya et al. | 361/301.1 |
| 5,343,353 | 8/1994 | Miki et al. | 361/322 |
| 5,372,850 | 12/1994 | Uchikawa et al. | 427/255.3 |
| 5,478,610 | 12/1995 | Desu et al. | 427/573 |

*Primary Examiner*—Brian K. Talbot
*Attorney, Agent, or Firm*—Rankin, Hill, Porter & Clark LLP

[57] ABSTRACT

The present invention relates to a method of making conductive electrodes for use in multilayer ceramic capacitors or inductors using organometallic ink. The method includes the steps of providing an organometallic ink which is free of any particles in excess of 0.1 micron in diameter and which contains an organometallic compound containing at least one of tin or ruthenium, applying the organometallic ink to a dielectric substrate, and sintering the organometallic ink to form a metal oxide film having a thickness of less than about 1.5 microns.

6 Claims, No Drawings

METHOD OF MAKING CONDUCTIVE ELECTRODES FOR USE IN MULTILAYER CERAMIC CAPACITORS OR INDUCTORS USING ORGANOMETALLIC INK

FIELD OF THE INVENTION

This invention relates to conductive electrodes for use in multilayer ceramic capacitors or inductors prepared from organometallic ink and methods of preparing the same. More specifically, the conductive electrode comprises a metal oxide film derived from at least one organometallic ink containing tin or ruthenium.

BACKGROUND OF THE INVENTION

Multilayer ceramic capacitors and inductors consist of a plurality of interleaved and staggered layers of an electrically conductive film of metal (termed "electrode"), formed by the deposition (usually by screen printing or variations thereof) of a thick film paste (termed an "electrode composition") and electrically insulating layers of a ceramic oxide (termed "dielectric"), formed by laying a cast dielectric tape or by casting a dielectric slurry over the dried electrode. Such capacitors and inductors are well-known in the art. U.S. Pat. No. 2,389,420, for example, describes the structure, manufacture and properties of monolithic multilayer ceramic capacitors formed using cast dielectric green (unfired) tape.

The electrode composition is usually a dispersion of finely divided precious metal powders, such as palladium, silver, gold, or platinum or their mixtures, in a vehicle or carrier which is usually solely organic in nature. Dispersions of non-precious metals such as copper and nickel have also been shown to have utility in electrode compositions. The vehicle is usually composed of a mixture of a polymeric resin which imparts viscosity to the composition and appropriate solvents for processing compatibility, particularly with respect to drying. Other organic additives are usually made to the vehicle to control paste rheology. Typical electrode composition metal concentrations range from 40% to 70% by weight, with the remainder being vehicle. Electrode compositions are deposited, usually by screen printing techniques, on dried dielectric layers, then dried to remove solvents and leave a mixture of metal powders and resin from the vehicle.

The dielectric layer is usually composed of finely divided oxide powders dispersed in a resin to form a slip. This slip is then cast to form green dielectric tape. Barium titanate ($BaTiO_3$) and other oxides such as neodymium titanate ($Nd_2Ti_2O_7$) and magnesium titanate ($MgTiO_3$) are used. Additions are usually made to these oxides to control various electrical characteristics, particularly to maximize dielectric constant while controlling the temperature dependence of dielectric constant and insulation resistance, among other properties. The resin is present in the dielectric layers to facilitate casting, handling and printing of electrodes on the layers.

Multilayer ceramic capacitors are manufactured by building up an interleaved configuration of electrode and dielectric layers, dicing individual parts out of the build-up then subjecting the parts to a slow burnout and then high temperature firing. Burnout is done to remove the organic resin in the electrode and dielectric layers to avoid rapid outgassing and rupture of the parts. Firing is done to a peak temperature (the "dielectric maturation temperature") both to densify the dielectric for maximum dielectric constant and physical strength, and to react the chemical constituents of the dielectric so that other desired electrical characteristics are achieved. During the firing step, the powder grains in the electrode layers also sinter and densify so as to produce a continuous, highly electrically conductive metal film.

U.S. Pat. No. 4,954,926, issued to Pepin, relates to thick film conductor compositions. The thick film conductor composition comprises (A) finely divided particles of electrically conductive metal, metal oxide precursors or alloys of the conductive metals, or mixtures thereof, dispersed in (B) an organic medium comprising (1) an organometallic compound, the metal or metal oxide moiety of which is soluble in the electrically conductive metal and/or the oxides of the metal moiety are non-reducing in the presence of electrically conductive metal, the organometallic compound being dissolved in; (2) a solution of polymeric binder in volatilizable solvent.

U.S. Pat. No. 5,244,742, issued to Ogi et al, relates to ultrahigh purity ferroelectric thin films. The thin film of lead containing ferroelectric materials represented by the formula $Pb_{1-x}La_x(Zr_yTi_{1-y})_{1-x/4}O_3$, where Y is 0 or 1 or a decimal smaller than 1, characterized in that the total content of alkali metal impurities therein is less than 1 ppm.

U.S. Pat. No. 5,372,850, issued to Uchikawa et al, relates to a method of manufacturing an oxide-system dielectric thin film using CVD methods. The oxide-system dielectric thin film is coupled with an organic group through oxygen atoms by the CVD method.

SUMMARY OF THE INVENTION

The present invention relates to a multilayer ceramic capacitor or inductor having a conductive electrode comprising a metal oxide film derived from at least one organometallic ink containing tin or ruthenium, wherein the film has a thickness of less than about 1.5 microns. In order to provide an electrode with such a minimal thickness, the organometallic ink is free of metal particles. The invention also relates to a method comprising the steps of providing a organometallic ink comprising a organometallic compound and a carrier, applying the organometallic ink to a dielectric substrate or precursor thereof such as green (unfired) ceramic tape, and sintering the organometallic ink to form a metal oxide film having a thickness of less than about 1.5 micron. The present invention and method provides conductive electrodes which have low resistivity and are thin in size. The materials are prepared from less expensive metals and therefore are of lower cost as compared to conventional electrode materials. Also, the electrodes of the present invention have decreased delamination from dielectric substrates as compared to conventional electrode materials.

DETAILED DESCRIPTION OF THE INVENTION

As used in the claims and specification, organometallic ink refers to organic metal salts or complexes (organometallic compounds) in combination with a vehicle or carrier. The inks are useful in preparing metal oxide films which are useful as conductive electrodes. These films have low resistivity. Typically, the metal oxide films have a resistivity of less than about 0.5, or less than about 0.1 ohms-meter.

As described above, the present invention relates to conductive electrodes prepared from organometallic inks. The organometallic inks are placed onto a dielectric substrate such as conventional green ceramic tape commonly used to produce capacitors and inductors, alumina ($Al_2O_3$), beryllia (BeO), aluminum nitride (AlN), and silicon carbide (SiC) and sintered to form metal oxide films. The films are generally less than about 1.5, or less than about 1 micron. In one embodiment, the film thickness is from about 0.005 to about 1, or from about 0.05 to about $0.8\mu$ micron. The organometallic ink is placed on the substrate by dipping or any conventional printing process, such as screen printing, ink jet printing, and curtain coating. The ink is capable of providing such thin films and electrodes because it is free of metal particles. Thus, the ink does not contain any particle having a diameter in excess of $0.1\mu$.

Once the organometallic ink is placed on the substrate or green ceramic tape, the ink is dried below 200 °C., preferably at about 120° C. for about 5 to 15 minutes before firing. Firing effects sintering of both the inorganic binder and the finely divided particles of the organometallic ink. The firing is done in a controlled, non-oxidizing environment belt conveyor furnace having a temperature profile that will allow burnout of the organic matter at about 300° C. to about 600° C., a period of maximum temperature of about 800° C. to about 900° C. lasting about 5–15 minutes, followed by a controlled cooled down cycle to prevent over sintering, unwanted chemical reactions that enter immediate temperatures or substrate fracture which can occur from too rapid cooling. The overall firing process will preferably extend over a period of about 30 minutes, with about 8 to about 12 minutes to reach the firing temperature, about 5 to 10 minutes at firing temperature, and about 8 to 12 minutes in a cool down.

As described above, the organometallic compound is a compound that leads to the formation of a metal oxide upon firing or sintering and it contains at least one of tin or ruthenium. The organometallic compound is present in the ink in an amount from about 10% to about 98% by weight. In one embodiment, the organometallic compound contains (i) tin or ruthenium and (ii) at least metal selected from the group consisting of Group IIa, Group IIb, Group IIIa, Group IIIb, Group IVa, Group Va, Group VIIIa metals and mixtures of two or more thereof. Typically, the tin or ruthenium metal is present in an amount from about 1% to about 25%, or from about 2% to about 20%, or from about 3% to about 20% by weight of the ink. The other metals are typically present in an amount from about 0.5% to about 20%, or from about 1% to about 18%, or from about 2% to about 15% by weight of the ink. Examples of the metal (ii) include magnesium, calcium, antimony, barium, lanthanum, rhodium, iridium, indium, zinc, aluminum, bismuth, lead, and mixtures thereof. In one embodiment, the metal is selected from the group consisting of Group IIa metals, Group IIIa metals, Group Va metals, and mixtures thereof. Examples of these useful metals include barium, bismuth, indium and mixtures thereof. Generally speaking, the organometallic compound may be described as follows: Metal$_x$-(Bridging Atom)- (Organic Moiety) wherein the bridging atom is either nitrogen, sulfur or oxygen.

The organometallic compound typically has organic groups which provide the stability and handlability needed to prepare the metal oxide layer. Generally, the organometallic compound is a metal carboxylate, aldehyde, amine, ketone, mercaptide, or mixtures thereof. In a preferred embodiment, the organometallic compound is metallo carboxylic salt.

The metal carboxylate is derived from a carboxylic acid which may have from one to about four, or from one to about two, or just one carboxylic group. The carboxylic acid generally has from about 2 to about 30, or from about 4 to about 20, or from about 6 to about 18 carbon atoms. Here, as well as elsewhere in the specification and claims, the range and ratio limit may be combined. The carboxylic acid, in one embodiment, is a branched carboxylic acid, having at least one secondary or tertiary carbon atom. Examples of carboxylic acids include 2-ethylhexyl acid, naphthenoic acid, tall oil fatty acids, hexanoic acid, heptanoic acid, octanoic acid, n-nonanoic acid, isononanoic acid, and neodecanoic acid. Mixtures of acids may be used.

In another embodiment, the organometallic compound is a metal amine or a metal aldehyde or ketone complex. The aldehydes and ketones may contain from about 2 to about 30, or from about 3 to about 18 carbon atoms. Examples of these components are butanal, pentanal, hexanal, heptanal, octanal, dodecanal, dimethyl ketone, diethyl ketone, dibutyl ketone, methylethyl ketone, methyl butyl ketone, and ethylhexy ketone.

In another embodiment, the organometallic compound is a mercaptide or sulfide. Typically the sulfide contains from about 4 to about 30, or from about 5 to about 20, or from about 6 to about 18 carbon atoms. The sulfides may also be thioalkanols, such as thioethanol and thiodiethanol. Examples of other sulfides, such as alkylsulfides, include butylsulfude, hexyl sulfide, heptyl sulfide and octyl sulfide.

The organometallic compound may be prepared by double decomposition of a corresponding ammonium soap. For instance, a organometallic compound may be prepared by reacting a carboxylic acid with ammonium hydroxide or an alkyl amine, such as mono, di or triethyl amine, to form an ammonium salt of the carboxylic acid. This ammonium salt is then reacted further with a metal chloride or nitrate of the desired metal. The reaction occurs in an aqueous environment. For most metals, this aqueous procedure is sufficient. For some metals, such as tin, lead and bismuth, the metal salt must be dissolved in an acidic solution to avoid formation of insoluble precipitates.

The following examples relate to formation of organometallic compounds. Unless otherwise indicated in the specification and claims, the amounts and ratios are by weight, temperature is in degrees Celsius and pressure is atmospheric pressure.

EXAMPLE A

Barium chloride dihydrate (150 grams, 0.61 mole) is dissolved in 300 ml of water. Neodecanoic acid (245 mil, 1.2 moles) is neutralized with ammonium hydroxide (75 ml, 1.2 moles). The solution is stirred for 20–25 minutes whereupon the barium chloride solution is added with vigorous stirring. A white gummy barium soap forms on top of the reaction mixture. The soap is dissolved in xylene (200 ml) and water washed in a separatory funnel. The xylene solution is vacuum distilled at 40° C. using a rotary vacuum unit. The residue is the desired barium soap of neodecanoic acid.

EXAMPLE B

A mixture of 2-ethylhexanoic acid (5 grams, 0.095 mole), triethylamine (9.71 grams, 0.096 mole), and water (15 ml) are stirred in a reaction vessel. To the reaction mixture is added, slowly, a solution of 0.024 moles of ruthenium chloride in 30 ml of water. The reaction mixture is stirred for 30 minutes at room temperature and then is heated to 60–70° C. with stirring. The temperature is maintained for one hour and 45 minutes. A black oily residue forms and is washed six times with warm water (40–50° C.). The ruthenium soap of 2-ethylhexanoic acid is extracted with xylene and dried. The xylene is removed by vacuum distillation. The residue is the desired product.

Organometallic compound mixtures for use in the ink may be prepared by mixing $(C_xH_yCOO)_zM_w$ or $(C_xH_yN)_zM_w$ or $(C_xH_yS)_zM_w$ or $(C_xH_yP)_zM_w$ or $(C_xH_yCO)_zM_w$. Where M=Ba, Ca, Sr, Mg, La, Ru, Rh, Ir, In, Sn, Zn, Al, Bi, Pb. Upon firing the organometallic compounds dissociate and form a conducting oxide film. The compositions of fired conducting oxide films may be from any of the following families.

I). $(Bi_{2-x} M) (M^1{}_yM^{11}{}_{2-y}) O_{7-z}$ Where M=Y, Th, In, Cd, Pb or rare earths, $M^1$=Pt, Ti, Cr, Rh, Sb, $M^{11}$=Ir or Ru, II). $ABO_3$ Where A=Ca, Sr, La, Ba and B=Ru, Ir, and III). $In_xSn_yO_z$; $Al_xZn_yO_z$; and $Cd_xIn_yO_z$.

The following examples 1–3 relate to mixtures of organometallic compounds which are useful in preparing organometallic inks.

EXAMPLE 1

A barium ruthenium organometallic mixture of compounds for use in an ink is prepared by mixing 45% by weight of barium neodecanoate solution (assay 35% by weight barium carbonate) with 55% by weight of a ruthenium octaanoate solution (assay 25% by weight ruthenium oxide).

EXAMPLE 2

A bismuth ruthenium organometallic mixture of compounds for use in an ink is prepared by mixing 50% by weight of a bismuth octaanoate solution (assay 35% by weight bismuth oxide) and 50% by weight of a ruthenium octaanoate solution (assay 20% by weight ruthenium oxide).

EXAMPLE 3

An indium tin organometallic mixture of compounds for use in an ink is prepared by mixing 96% by weight of a indium octaanoate solution (assay 20% by weight indium oxide) and 4% by weight of a tin octaanoate solution (assay 25% by weight in oxide).

EXAMPLE 4

An indium tin organometallic ink is prepared by mixing 77% by weight of an indium octaanoate solution (assay 20% by weight indium oxide), 3% by weight of a tin octaanoate solution (assay 25% by weight tin oxide), 18% by weight V-500, an organic vehicle available from Ferro Corporation, and 2% by weight V-450, an organic vehicle available from Ferro Corporation.

It is advantageous for these compositions to also include a carrier or vehicle for applying the composition to a substrate. While green tape carriers are contemplated to be within the scope of the present invention, a liquid carrier is preferred. The liquid carrier will generally comprise an organic solvent, a resin, and, optionally, a thixotropic agent and/or a wetting agent. The main purpose of the carrier is to serve as a vehicle for dispersing the organometallic compounds in such form that the organometallic ink can readily be applied to a ceramic or other substrate. The rheological properties of the carrier must be such that they lend good application properties to the dispersion. The carrier must have appropriate viscosity so that they can be passed through the screen readily. In addition, they should be thixotropic in order that they set up rapidly after being screened in order to give good resolution. While the Theological properties are of primary importance, the carrier is preferably formulated also to give appropriate wettability of the solids and the substrate, good drying rate, dried film strength sufficient to withstand rough handling and good firing properties. Satisfactory appearance of the fired composition is also important.

Typically the organometallic inks contain from about 75% to about 99%, or from about 80% to about 98% by weight organometallic compounds solids and from about 1% to about 25%, or from about 2% to about 20% by weight carrier.

In view of all of the foregoing criteria, a wide variety of inert liquids may be used in the carrier. The carrier is typically a solution of a resin dissolved in a solvent and, frequently, a solvent solution containing both resin and a thixotropic agent. The solvent usually boils within the range of 130°–350° C. Solvents include terpenes, such as alpha- or beta-terpineol, mineral spirits, dibutyl phthalate, butyl carbitol, butyl carbitol acetate, hexylene glycol and high-boiling alcohols and alcohol esters. Various combinations of these and other solvents formulated to obtain the desired viscosity and volatility requirements for each application. The solvent is present in an amount sufficient to allow screen printing of the organometallic ink. Typically the solvent is present in an amount from 50% to 95% by weight of the carrier.

The most frequently used resin for this purpose is ethyl cellulose. However, resins such as ethyl hydroxyethyl cellulose, wood rosin, mixtures of ethyl cellulose and phenolic resins, polymethacrylates of lower alcohols and monobutyl ether of ethylene glycol monoacetate may also be used. The resin is present in an amount sufficient to provide rheology needed for screen printing. Typically the resin is present in an amount from 1% to 30% by weight of the carrier.

Among the thixotropic agents which are commonly used are organic based thixotropics such as, for example, hydrogenated castor oil and derivatives thereof and ethyl cellulose. It is of course, not always necessary to incorporate a thixotropic agent since the solvent/resin properties coupled with the sheer thing inherent in any suspension may alone be suitable in this regard.

Furthermore, a wetting agent may be employed such as phosphate ester and soya lecithin, fatty acid esters, e.g., N-tallow-1,3-diaminopropane di-oleate, N-tallow trimethylene diamine diacetate, N-coco trimethylene diamine, beta diamines, N-oleyl trimethylene diamine, N-tallow trimethylene diamine, and/or N-tallow trimethylene diamine dioleate.

The organometallic ink may also include one or more rheology modifiers or flow control agents. Examples of rheology modifiers include poly(lauryl acrylate), polybutyl acrylate, poly(2-ethylhexyl) acrylate, poly(lauryl methacrylate), polyisodecenyl methacrylate, fluorinated polymers such as an ester of polyethylene glycol or polypropylene glycol and fluorinated fatty acids, for example, an ester of polyethylene glycol of a molecular weight of over 2500 and perfluorooctanoic acid. Polymeric siloxanes of molecular weights over about 1000 may also be used, for example, poly(dimethylsiloxane) or poly(methylphenyl) siloxane or organo-silicones such as, for example, OSI L-7602, OSI L-7500 or OSI L-77.

The organometallic ink may also include miscellaneous additives and fillers. Additives include for example, surfactants and stabilizer-type additives such as UV absorbing agents and antioxidants. Examples of specific stabilizers include Tinuvin and Irganox stabilizers available from Ciba-Geigy. Potential surfactant additives include the alkylene oxide treated products such as ethylene oxide treated phenols, alcohols, esters, amines and amides. Additional surfactants include ethylene oxide-propylene oxide block copolymers, and glycerol esters and sugar esters.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A method of making a conductive electrode for use in a multilayer ceramic capacitor or inductor comprising providing an organometallic ink that is free of metal particles and that is free of any particles in excess of 0.1 micron in diameter, said organometallic ink comprising an organometallic compound containing at least one of tin or ruthenium and a vehicle, applying said organometallic ink to a dielectric substrate, and sintering said applied organometallic ink to form a metal oxide film having a thickness of less than about 1.5 microns.

2. The method of claim 1 wherein the organometallic compound is a metal carboxylate, aldehyde, amine, mercaptide, ketone, or mixtures thereof.

3. The method of claim 1 wherein the organometallic compound is metallo carboxylic salt.

4. The method of claim 1 wherein the organometallic compound contains tin or ruthenium and at least one metal selected from the group consisting of Group IIa, Group IIb, Group IIIa, Group IIIb, Group IVa, Group Va, Group VIIIa metals and mixtures of two or more thereof.

5. The method of claim 1 wherein the organometallic compound contains ruthenium or tin and at least one metal selected from the group consisting of magnesium, calcium, antimony,, barium, lanthanum, rhodium, iridium, indium, zinc, aluminum, bismuth, lead, and mixtures thereof.

6. The method of claim 1 wherein said dielectric substrate comprises green ceramic tape.

* * * * *